Sept. 22, 1959   W. C. JOHNSON, JR   2,905,783
AUTOMATIC SWITCH ASSEMBLY FOR STOCK TANK
Filed July 3, 1957

W. C. JOHNSON, JR.
INVENTOR.

BY Arthur H. Sturges
Attorney

United States Patent Office 2,905,783
Patented Sept. 22, 1959

2,905,783
AUTOMATIC SWITCH ASSEMBLY FOR STOCK TANK

William C. Johnson, Jr., Napoleon, N. Dak.

Application July 3, 1957, Serial No. 669,777

3 Claims. (Cl. 200—84)

This invention relates to water lever control devices such as used in tanks and particularly stock watering tanks, and in particular a float actuated switch with a float positioned in a tube and connected to a switch at the upper end of the tube wherein with the tube assembly suspended by a bracket from the upper edge of a wall of a tank the float is moved upwardly to actuate the switch to open a circuit of a motor of a pump for supplying water to the tank as the water reaches a predetermined level, and upon the water receding the float drops closing the circuit to the motor and thereby actuating the pump to supply additional water to the tank.

The purpose of this invention is to provide water level control means for a tank in which a pump is actuated to supply water to the tank as the level of water in the tank drops, and wherein the operation of the pump is terminated as the water reaches a predetermined level.

Various types of devices have been provided for controlling the level of water in tanks, and particularly watering tanks and troughs, however, it is difficult to protect such devices from being damaged by stock, and where such devices are enclosed in protecting housings servicing the parts is difficult. With this thought in mind this invention contemplates a tubular casing having slots in the wall thereof with a switch in a sealed housing at the upper end, and with a rod having a ball providing a float on the lower end, and positioned with the upper end extended into the switch housing.

The object of this invention is, therefore, to provide a float and switch assembly adapted to be suspended by a bracket from the upper edge of a wall of a tank wherein as water level in the tank reaches a predetermined elevation the supply of water to the tank is terminated, and upon receding of the water level the supply of water to the tank is continued.

Another object of the invention is to provide a float and switch assembly in which the assembly is incorporated in a tube and wherein the tube is supported by a bracket from the upper edge of a wall of a tank.

Another important object of the invention is to provide a water level control device in which the operating parts are enclosed in a relatively small tubular casing.

It is yet another object of the invention to provide a water level control device for stock watering tanks in which the device may readily be moved from one position to another as a unit.

A further object of the invention is to provide a water level control device that is relatively small and compact, and that is designed to be installed by the average layman.

A still further object of the invention is to provide a float and switch assembly for controlling the water level of a tank in which the device is of a simple and economical construction.

With these and other objects and advantages in view the invention embodies a tubular casing having openings in the wall thereof and a cap on the upper end, a bracket in the upper part of the casing, a housing having a pair of contacts therein mounted on the bracket, and a rod having a float on the lower end slidably mounted in the bracket and positioned to open the contacts as the float is moved upwardly by water in the casing, and permit the contacts to close as the elevation of the water drops.

Other features and advantages of the invention will appear from the following description taken in connection with the drawings, wherein.

Figure 1:
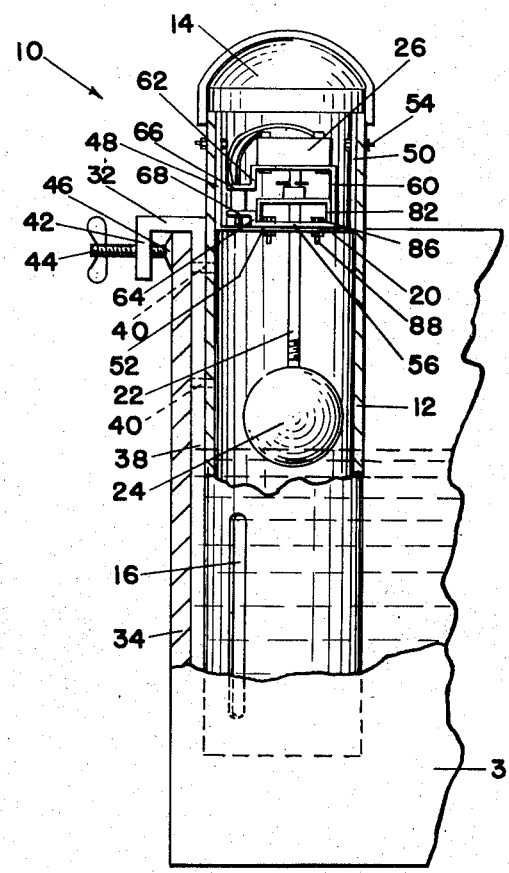
Figure 1 is a vertical section through an end of a tank showing a float and switch assembly on a bracket in a tubular casing with part of the casing and also part of the tank shown in elevation.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a tubular casing having a cap 14 on the upper end and slots 16 in the wall, numeral 20 a bracket positioned in the casing, numeral 22 a rod slidably mounted in the bracket and having a float 24 on the lower end, numeral 26 a switch housing having contacts 28 and 30 therein, and numeral 32 a clamp for mounting the assembly on the upper edge of a wall 34 of a tank 36, or the like.

The clamp 32 is provided with a long leg 38 that is secured to the tubular casing 12 by screws 40, and a short leg 42 in which a thumb screw 44 is threaded, and the inner end of the thumb screw is provided with a washer 46 that grips the outer surface of the wall 34 of the tank. With the assembly mounted in this manner the complete water level control device may readily be moved from one position to another on a tank or the like.

The bracket 20 is U-shaped in elevation having upwardly extended arms 48 and 50 which extend from a base 52, and the arms are secured to the wall of the casing 12 by screws 54. A rectangular-shaped switch support is positioned on the bracket with a base 56 on the base 52 of the bracket, and with a bar 58 on which the switch housing 26 is positioned suspended above the base by a vertically disposed bar 60, at one side, and with sections 62 and 64 of a bar at the opposite side secured by flanges 66 and 68 to a terminal box 70 from which electric supply wires 72 and 74 extend.

The rod 22 is slidably mounted in a collar 76 extended upwardly from an upper bar 78 of a spacer having end sections 80 and 82, and the lower ends of the sections 80 and 82 are provided with flanges 84 and 86 through which bolts 88 extend, the bolts also extending through the base 52 of the bracket 20, and the base 56 of the switch support.

The lower end of the rod 22 is threaded into the ball or float 24 and the upper portion is provided with a pin 90 that engages the upper end of the collar 76 to limit downward movement of the rod and float. The upper end of the rod is provided with a head 92 of insulating material, or the like, and the head is positioned to engage the upper contact point 28 to open the switch.

Figure 2:
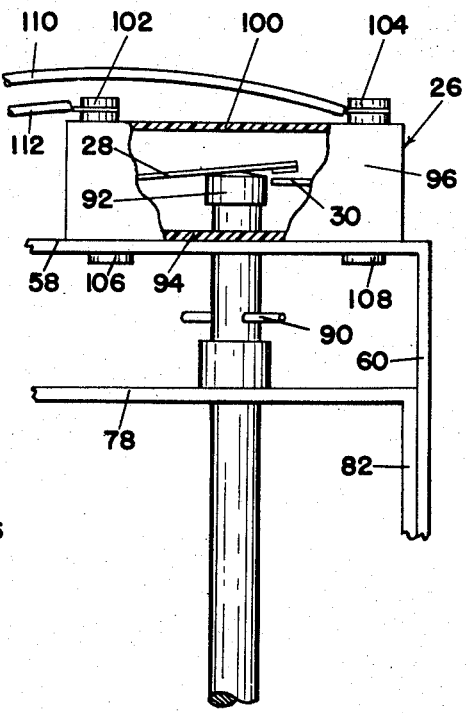
Figure 2 is a view similar to that shown in Figure 1 with the parts shown on an enlarged scale and with part of the switch housing broken away to show the contacts of the switch opened by a rod of a float.
Figure 3:
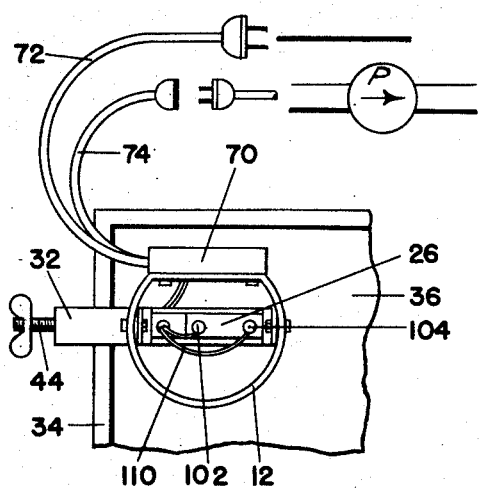
Figure 3 is a plan view of the float and switch assembly with a cap on the upper end of the tubular casing omitted and with part of the tank broken away.

The switch housing 26 is formed with a base 94, upwardly extended side walls 96 and end walls 98, and an upper panel 100 on which terminals 102 and 104 are positioned. The switch housing is secured to the bar 58 of the switch support by screws 106 and 108, and with the parts as shown in Figure 2 the rod 22 extends through the base 94 of the housing. The terminals 102 and 104 of the switch housing are connected by wires 110 and 112 to the terminal box 70, from which wires extend to a source of current supply and also to a motor for actuating a water supply pump.

With the parts as illustrated and described the water level control unit is installed on a tank, as illustrated in Figure 1, and as the water level in the tank drops, the float moves downwardly drawing the rod away from the upper contact point 28 whereby the point 28 engages the point 30 and completes a circuit to a motor for actuating a pump which supplies water to the tank, and as the water level moves upwardly until the water urges the float upwardly the float rod moves the contact 28 away from the contact 30 breaking the circuit to the pump motor. This cycle of operations is continued indefinitely maintaining a constant supply of water in the tank.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A water level control for use in a tank comprising a tubular casing having slots in the wall thereof and a cap on the upper end, a clamp on the casing for supporting the casing from a wall of a tank, a switch housing in the upper end of the casing, a switch in the housing, a float positioned in the tubular casing, and a rod connecting the float to the switch whereby with the tubular casing suspended from the upper edge of a wall of a tank water in the tank actuates the float to open the switch as the water reaches a desired level, and permits the switch to close as the water drops to a predetermined level.

2. In a water level control, the combination which comprises a tubular casing having slots in the lower part, a closure on the upper end of the tubular casing a thumb screw clamp on one side of the casing, a bracket mounted in the upper end of the casing, a switch housing carried by the bracket, a terminal box on said bracket, contacts in the switch housing connected by wires to terminals in the terminal box, a rod slidably mounted in the bracket, extended into the switch housing, and positioned to open said contacts, a float on the lower end of the rod, the float being positioned in the tubular casing, and means connecting the terminals of the terminal box to a current supply and also to means for supplying water to a container in which the tubular casing is positioned.

3. In a water level control, the combination which comprises a vertically disposed tubular casing having openings in the lower part and a cap on the upper end, a thumb screw clamp on the casing for supporting the casing in a tank, a bracket mounted in the upper end of the casing, a switch housing support mounted on the bracket, a switch housing on the support, a terminal box also mounted on the support, contacts in the switch housing, a rod slidably mounted in the bracket and support and positioned with the upper end extended into the switch housing for opening said contacts, and a float on the lower end of the rod for moving the rod upwardly as water in a tank in which the casing is positioned reaches a predetermined level for opening the contacts, the rod permitting the contacts to close upon dropping of the water level and having means thereon for limiting downward movement thereof.

References Cited in the file of this patent

UNITED STATES PATENTS

| | | |
|---|---|---|
| 1,220,954 | Chapman | Mar. 27, 1917 |
| 1,506,101 | Winkler et al. | Aug. 26, 1924 |
| 2,663,772 | Cochrane | Dec. 22, 1953 |
| 2,726,296 | Hanson et al. | Dec. 6, 1955 |
| 2,749,401 | Castner | June 5, 1956 |
| 2,780,692 | Hinojosa | Feb. 5, 1957 |